(12) United States Patent
Depoutovitch et al.

(10) Patent No.: US 12,373,401 B2
(45) Date of Patent: Jul. 29, 2025

(54) METHODS AND APPARATUS USING LOCKS TO THROTTLE A DISTRIBUTED CLOUD DATABASE WORKLOAD

(71) Applicant: HUAWEI CLOUD COMPUTING TECHNOLOGIES CO., LTD., Gui Zhou Province (CN)

(72) Inventors: Alexandre Depoutovitch, Kanata (CA); Jack Hon Wai Ng, Kanata (CA); Chong Chen, Kanata (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 28 days.

(21) Appl. No.: 18/087,482

(22) Filed: Dec. 22, 2022

(65) Prior Publication Data

US 2024/0211448 A1    Jun. 27, 2024

(51) Int. Cl.
*G06F 16/21* (2019.01)
*G06F 11/34* (2006.01)
*G06F 16/23* (2019.01)

(52) U.S. Cl.
CPC .......... *G06F 16/21* (2019.01); *G06F 11/3433* (2013.01); *G06F 16/2358* (2019.01)

(58) Field of Classification Search
CPC ... G06F 16/21; G06F 11/3433; G06F 16/2358
See application file for complete search history.

(56) References Cited

U.S. PATENT DOCUMENTS

| | | | | |
|---|---|---|---|---|
| 9,286,341 B2* | 3/2016 | Labuda | ............... | G06F 16/23 707/610 |
| 9,294,558 B1* | 3/2016 | Vincent | ............... | H04L 67/1006 707/610 |
| 2014/0195480 A1* | 7/2014 | Talagala | ............... | G06F 16/2365 707/610 |
| 2016/0344834 A1* | 11/2016 | Das | ............... | H04L 67/1097 707/610 |
| 2019/0012084 A1* | 1/2019 | Schreter | ............... | H04L 69/40 707/737 |
| 2019/0129848 A1* | 5/2019 | Hu | ............... | G06F 9/526 707/610 |
| 2020/0250092 A1* | 8/2020 | Szeredi | ............... | G06F 12/0897 707/610 |
| 2021/0026704 A1* | 1/2021 | Nandagopal | ............... | G06F 9/5083 707/999.003 |
| 2023/0057068 A1* | 2/2023 | Bhandarkar | ............... | H04L 47/562 707/610 |

* cited by examiner

*Primary Examiner* — Yuk Ting Choi

(57) ABSTRACT

A method of managing load in a database system includes receiving, by a compute node, from a page store, a log writing quota. Then, requesting, by a transaction of the compute node, a lock of a page to be modified by the transaction where the page is part of the page store including a plurality of pages and the transaction is configured to write a data amount to a log. Also, granting, by a lock manager of the compute node, the lock and determining, by the compute node, that the data amount exceeds the log writing quota. Furthermore, releasing, by the transaction, the lock, and throttling, by the compute node, the transaction until a criteria is fulfilled. Then, reacquiring, by the transaction, in response to the criteria being fulfilled, the lock, and writing, by the compute node, the data amount to the log.

8 Claims, 7 Drawing Sheets

METHODS AND APPARATUS USING LOCKS TO THROTTLE A DISTRIBUTED CLOUD DATABASE WORKLOAD

CROSS-REFERENCE TO RELATED APPLICATIONS

This is the first application filed for the present invention.

FIELD OF THE INVENTION

The present invention pertains to the field of throttling in a multi-layered system, and in particular to methods and apparatus for using page locks to manage a distributed cloud database workload.

BACKGROUND

Currently, modern database systems are generally implemented as layered systems which include multiple (often distributed) components organized into layers. Each layer includes functionally independent components with well-defined interfaces for service requests and responses. Under a high user workload, a component of the system may become overloaded, which may result in various adverse effects, for example, resource exhaustion leading to failures of critical tasks, component throughput degrading with high loads to further aggravate overloading, denial of service leading to higher layer and system-wide failures, and the like.

Accordingly, throttling was introduced to prevent overloading of any component of any layer of the system. For example, when a storage layer of the multi-layered database system is overloaded by a compute layer, a throttling process may be triggered to prevent overloading in the system. Existing approaches of throttling include limiting user requests, suspending a problematic query during execution and resuming its processing at a later time, pausing query execution by self-imposing sleeps at intervals (referred to as "constant throttle approach"), and allowing compute layer queries to continue execution while the storage layer is not required (referred to as "targeted log flush approach").

However, existing approaches fail to consider resource requirements of individual transactions and queries and in particular which component of the system is actually overloaded. For example, when a storage node in the storage layer is overloaded, existing approaches will start throttling all the queries from one or more compute nodes in the compute layer, even if a majority of the queries actually do not use services of that particular storage node.

Therefore, there is a need for methods and apparatus for improved throttling in a multi-layered system that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods, apparatus and computer readable medium managing queries and transactions made in a database, and in a cloud based database in particular, in order to not overload a page store in a storage node. Page stores may determine a quota that is communicated to compute nodes that access that page store. When a compute node is executing a query that may write or update data in a page of the page store, the query may be throttled, for example, by causing it to sleep, until a later time, if the data to be written exceeds the quota. Similarly, if a transaction includes a number of queries, the transaction may be executed without throttling in order to avoid the issue of the throttling of a single query of the transaction from preventing the other transaction queries from being executed.

In accordance with an aspect of the present disclosure, there is provided a method of managing load in a database system. The method includes: receiving, by a compute node, from a page store, a log writing quota; requesting, by a transaction of the compute node, a lock of a page to be modified by the transaction, the page being part of the page store comprising a plurality of pages, the transaction configured to write a data amount to a log; granting, to the transaction, by a lock manager of the compute node, the lock; determining, by the compute node, that the data amount exceeds the log writing quota; releasing, by the transaction, to the lock manager, the lock; throttling, by the compute node, the transaction until a criteria is fulfilled; reacquiring, by the transaction, in response to the criteria being fulfilled, the lock; and writing, by the compute node, the data amount to the log.

In embodiments, the lock is a write lock.

In embodiments, throttling includes putting the transaction into a sleep state and the criteria is a period of sleep time.

In embodiments, the period of sleep time is calculated using a pre-determined algorithm. such as a sliding window algorithm.

In further embodiments, the log writing quota is expressed as an amount of data or log records, a rate of data or log records written, or an amount of data or log records written per unit of time.

Embodiments further include requesting, by a second transaction of the compute node, read access to the page, and receiving, by the second transaction, read access to the page.

In embodiments, in response to reacquiring, by the transaction, the lock, the method further includes, determining, by the compute node, that the data amount does not exceed the log writing quota.

In accordance with another aspect of the present disclosure, there is provided a method of managing load in a database system. The method includes: receiving, by a compute node, from a first page store, a first log writing quota; receiving, by the compute node, from a second page store, a second log writing quota; requesting, by the first transaction, a first lock of a first page to be modified by the first transaction, the first page being part of the first page store comprising a first plurality of pages, the first transaction configured to write a first data amount to a first log; requesting, by a second transaction, a second lock of a second page to be modified by the second transaction, the second page being part of the second page store comprising a second plurality of pages, the second transaction configured to write a second data amount to a second log; granting, to the first transaction, by a lock manager of the compute node, the first lock; granting, to the second transaction, by the lock manager of the compute node, the second lock; determining, by the compute node, that the first data amount exceeds the first log writing quota and that the second data amount does not exceed the second log writing quota; determining, by the compute node, a throttling time of the first transaction based on a criteria; writing, by the compute node, the first data amount to the first log and the second data amount to the second log; and releasing, by the first transaction, to the lock manager, the first lock, releasing, by the second transaction, to the lock manager, the second lock; and throttling the first transaction and the second transaction, until an expiry of the throttling time.

In embodiments, the throttling includes putting the transaction to sleep for the throttling time.

In embodiments, the criteria are determined using an algorithm such as a sliding window algorithm.

In accordance with another aspect of the present disclosure, there is provided a tangible, non-transitory computer readable medium having instructions recorded thereon to be performed by at least one processor to carry out a method as defined in any one of aforementioned methods.

In accordance with another aspect of the present disclosure, there is provided a system of compute node configured to carry out a method as defined in any one of aforementioned methods. The system includes at least one processor and a tangible, non-transitory computer readable medium. The computer readable medium includes instructions recorded thereon to be performed by the at least one processor of the system to carry out a method as defined in any one of aforementioned methods.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Aspects of the disclosure provides for methods and apparatus for controlling access to page stores of storage nodes of a computer system to prevent or limit resource exhaustion in the storage layer or the compute layer of the system.

Figure 1:
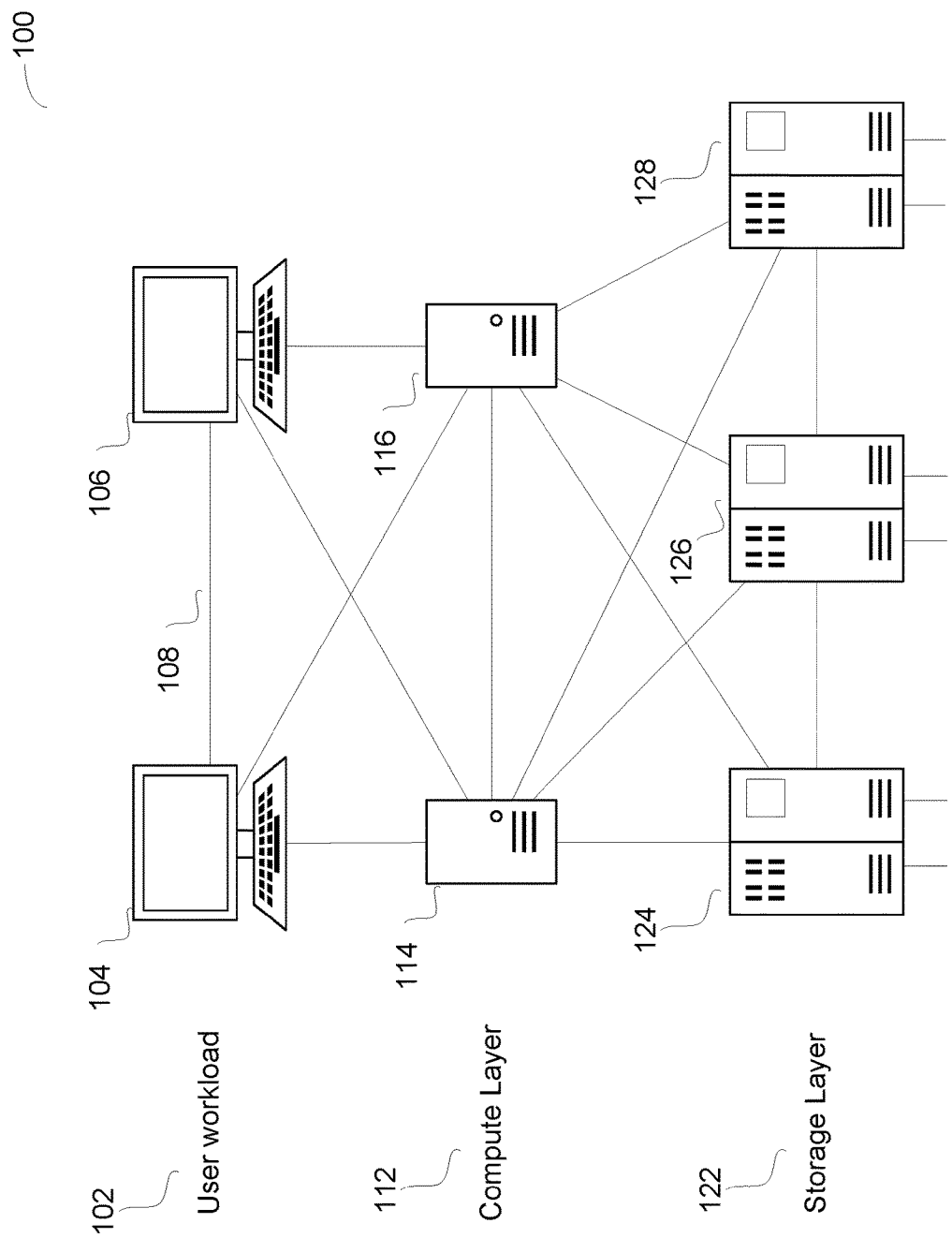
FIG. 1 illustrates a multi-layer computer system, according to an embodiment.

FIG. 1 illustrates a multi-layer computer system, according to an embodiment of the present disclosure. With reference to FIG. 1, a multi-layered system 100 can be structured in several layers. System 100 includes three layers while other systems typically include two to four layers. Each layer may be a functionally independent component with well-defined interfaces for service requests and responses. Requests may be initiated from a top, user workload layer 102, to a bottom layer 122. The top level of the layered system may be referred to as a user workload layer 102. The user workload layer 102 has the distinction that it is not directly controllable by the system itself. The middle layer may be referred to as the compute layer 112 and includes a number of processing computer components. The bottom layer may be referred to as the storage layer 122 and includes a number of storage components. Links 108 may be used to communicate between components within a layer or between layers.

Components of the user workload layer 102 may include computing devices 104 or 106 such as point of sale terminals, personal computers, servers, mobile devices such as cell phones, tablets, and other computing devices that may access a database to retrieve or write data. These components may also be referred to as nodes and may be a single or multiple devices, a physical or virtual device, and may be located at a single location or be distributed over multiple locations. Computing devices 104 or 106 may initiate transactions, which may also be referred to as queries and both terms may be used interchangeably herein, to read and write data to the database.

Components of the compute layer 112 may include one or more computing devices 114 or 116 such as a server, a cloud server, a workstation, a blade computer, and other computing devices that may receive requests from components of the user workload layer 102 and access the storage layer 122 to retrieve or write data. These components may also be referred to as compute nodes, or simply as nodes, and may be a single or multiple devices, a physical or virtual device, and may be located at a single location or be distributed over multiple locations. Components of the compute layer 112 handle tasks such as user connections and controls, and also executes queries.

Components of the storage layer 122 may include computing devices such as a servers, a cloud server, cloud storage, a disk array, and other computing devices that may receive requests from the compute layer 102 to retrieve or write data. These components may also be referred to as page stores and may be a single or multiple devices or hosts, a physical or virtual device, and may be located at a single location or be distributed over multiple locations. The components of the storage layer 122 are responsible for processing logs and persisting logs. Optionally, the storage layer 122 may also perform serving page reads, replicating data, persisting, and reading data from a permanent storage, and other storage related tasks.

In embodiments, under a high load a component of the compute layer 112 or the storage layer 122 of the system 100 may become overloaded. Overloading one component has several adverse effects. Resource exhaustion in the component may result in failures of critical tasks. Component throughput may degrade with high loads further aggravating overloading. Also, denial of service may result in an inability of higher layer components to keep multiple requests pending, which will result in a cascading denial of service and lead to system-wide failures. In order to address these problems, throttling may be introduced. Throttling is a process of reducing an incoming or outgoing request rate in order to prevent overloading of any component of any layer of the system 100. The ability to throttle is required for virtually any non-trivial multi-layered software system, which may be accomplished using methods as described herein.

Database systems in general, and cloud databases in particular, are a typical example of a multilayered system. In the illustrated system 100, when a storage layer 122 component is overloaded by a compute layer 112 component, throttling may be used to prevent overloading.

Figure 2:
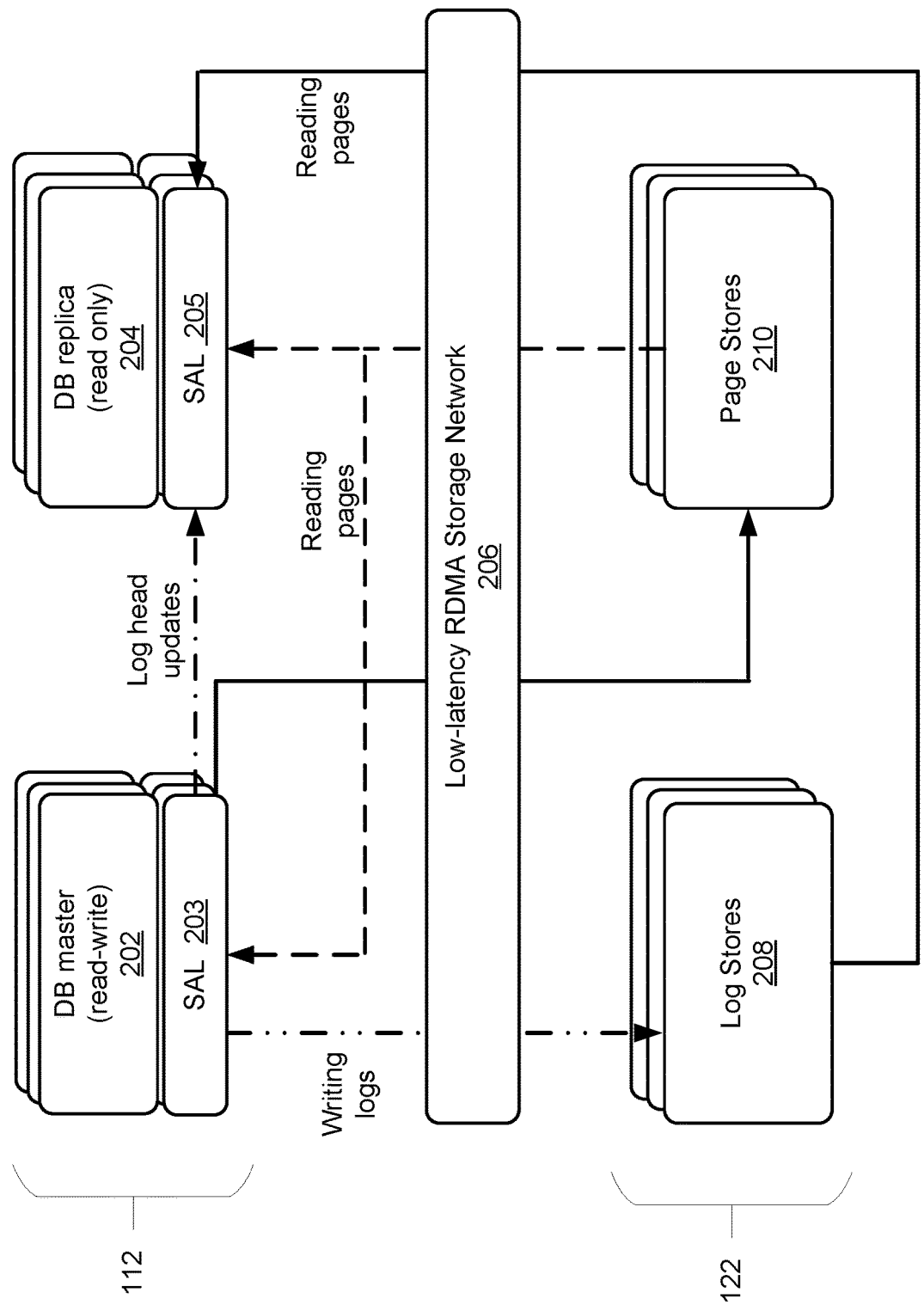
FIG. 2 illustrates a multi-layer cloud based database architecture, according to an embodiment.

FIG. 2 illustrates a multi-layer cloud based database architecture, according to an embodiment of the present disclosure. With reference to FIG. 2, a multi-layer cloud based database architecture is illustrated. In this example the system 100 includes two layers with one or more database (DB) master nodes 202 and one or more DB replica (read-only) nodes 204 which are part of a compute layer 112 and page stores 210 which are part of a storage layer 122. Note that the user workload layer 102 is not illustrated. Each DB master may perform data read or write activities and may be paired with a Storage Abstraction Layer (SAL) component. DB master 202 is paired with SAL 203, while DB replica 204 is paired with SAL 105. Log stores 208 and Page Stores 210 may be accessed by SAL 203 and SAL 205 through a low-latency, remote direct memory access (RDMA) based storage network 206.

In embodiments, a database may divide data into pages of small size such as 4 KB to 32 KB. A page is a minimal unit of atomic modification of a database physical structure. As is known in the art, before modifying a page, the database may be required to acquire a write lock or an exclusive lock on the page to be modified. After the modification is done, page lock is released. Note that in the art, a lock may also be referred to as a latch.

In embodiments, a database may persist changes in form of entries in log store 208. Each change to a page may be described using a log record that contains information of what has been changed on a page. In some cases, for databases that don't have intelligent storage layers and write pages completely on every change, the log record may be the page itself. Each such record is later sent to a page store 210 which is part of the storage layer for persistency and updating pages. Log store 208 records an ordered sequence of data writes or updates, and stores the log entries reliably. Data to be written to a page store 210 may first be written into a log store 208, thereby allowing computations to proceed. At a later time, a page store 210 may read from the log and apply the writes to storage so that all writes may be committed in order. Data may be written to a log store 208 by, for example, SAL 203 writing data to log store 208. The log head may be updated by SAL 203 writing to SAL 205. For reading data, SAL 203 or SAL 205 may read directly from page store 210. In general, embodiments can operate on any storage layer configuration where there is more than one compute node, and each compute node is responsible for a subset of pages.

In embodiments, one or more forms of throttling may be used to prevent storage layer 122 components from becoming overloaded. Throttling may be implemented by limiting an amount of requests coming from a user or a compute node, such as compute node 114 (e.g., as illustrated in FIG. 1). This may limit the number of transaction requests that may be in progress at any one time and in some cases, new requests may be refused. Similarly, a system 100 may be configured to accept all incoming requests but suspend a problematic transaction or query during execution to allow processing to be resumed at a later time. With this approach, partial results of suspended transactions may be stored in order to later complete processing the transaction. Transactions may also have their execution be momentarily suspended to slow the processing of the transaction while allowing the transaction to continue to be executed. In other cases, transactions that require persistency, i.e., sending log records to the storage layer 122, may be slowed or put to sleep while allowing other compute layer queries that do not currently require the storage layer to continue execution.

In embodiments, a storage layer 122 may be distributed across multiple (from two to hundreds to thousands) of storage nodes. Each node of the storage layer 122 may serve multiple users and often contains only a small piece of data that belongs to a particular user. As a result, storage layer 122 may not be overloaded evenly. Local hot spots (overloaded nodes) may appear in storage layer 122 and in order to reduce the overloaded nodes, throttle requests may be sent to all involved compute nodes of the compute layer 112. As a result, transactions may be rejected, put on hold, or slowed down as described above, including queries (often the majority of transactions) that don't need service of a particular overloaded storage node. For example, a compute node may be served by ten storage nodes. If a storage node becomes overloaded, it may request throttling from the compute node. Embodiments may utilize targeted throttling to slow down only transactions that use that particular storage node that is overloaded while not affecting other transactions that do not require access to the overloaded storage node.

Figure 3:
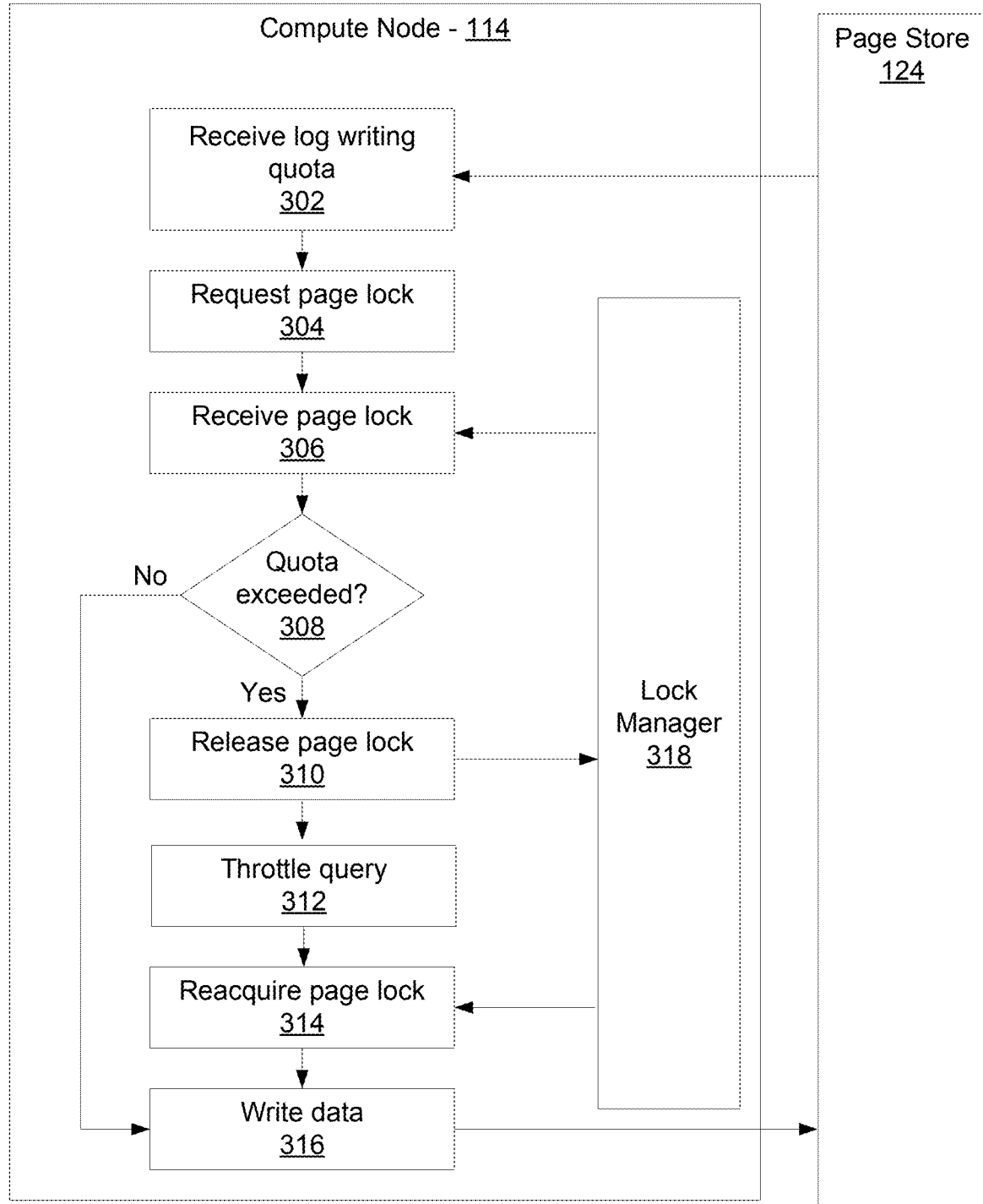
FIG. 3 illustrates a method of managing load in a database system, according to an embodiment.

FIG. 3 illustrates an embodiment including a method of managing load in a database system. The method includes multiple steps or actions. At step 302, a compute node 114 (e.g., of a computer layer 112) receives from a page store 124 a log writing quota. The log writing quota, or simply, quota, may be expressed as an amount of data, a rate of data, or an amount of data per unit of time. The page store 124 is part of a page store (e.g., 210 in FIG. 2) which includes a plurality of pages. At step 304, the transaction requests a lock of a page to be modified by a transaction, and the transaction is configured to write a data amount to a log. Furthermore, at step 306, the transaction receives (is granted) the lock by a lock manager 318 of the compute node 114. At step 308, the compute node determines whether the data amount exceeds the log writing quota. Note that in embodiments, step 308 may occur before step 306. If at step 308 determining that the data amount exceeds the log writing quota, subsequently at step 310, the transaction releases the page lock to the lock manager 318, and at step 312 the compute node throttles the query until a criteria is fulfilled. At step 314, the transaction may reacquire the page lock from the lock manager 318 in response to the criteria being fulfilled at step 312. Note that reacquiring the page lock may follow the same steps starting at step 304, involving checking the quota and potential throttling. For simplicity's sake, the example of FIG. 3 assumes that the quota is not exceeded and no throttling occurs. At step 316, the compute node 114 writes the data amount to the log of the page store 124. Alternatively, if at step 308, determining that the data amount does not exceed the log writing quota, subsequently at step 316 the compute node 114 writes the data amount to the log of the page store 124. In other words, if at step 308, determining that the data amount does not exceed the log writing quota, the steps of 310, 312, and 314 are not required. Note that in embodiments, it is not necessary to actually receive a lock before deciding and executing throttling. In these cases, it may be better to throttle immediately after the lock is requested and the quota is checked. Therefore, the lock may not be received until after it is determined that quota is not exceeded.

In embodiments the database system may track when a request is made for a write lock (which may be an exclusive lock) to a page and infer that the page may soon be modified. In database systems where exclusive page locks are only used prior to a page modification, the system may use this as a firm indication of a page about to be modified. Therefore, if a compute layer 112 node (e.g., 114) wants to exclusively lock a page that is served by a page store of a storage node that is being throttled, and the system knows that this query is going to modify the page and thus generate more logs to the page store that is being throttled, the system can throttle (e.g., put to sleep) the transaction that wants to acquire the lock to relieve load on the page store without throttling other transactions.

The transaction can be throttled (e.g., by being put to sleep) at any point between when it becomes known that a page that it modifies is from an overloaded page store, and the time the log is sent to the page store. In this manner, an executing transaction is throttled only when the storage node that is required by the transaction is known. Only transactions or queries that will put more load on an overloaded storage node (offending queries) will be slowed down or throttled. Transactions that will not put additional load on the overloaded page store or storage node will not be slowed down, and in fact may get additional resources and execute faster if load inducing transactions are throttled (slowed down, delayed, or put to sleep).

Figure 4:
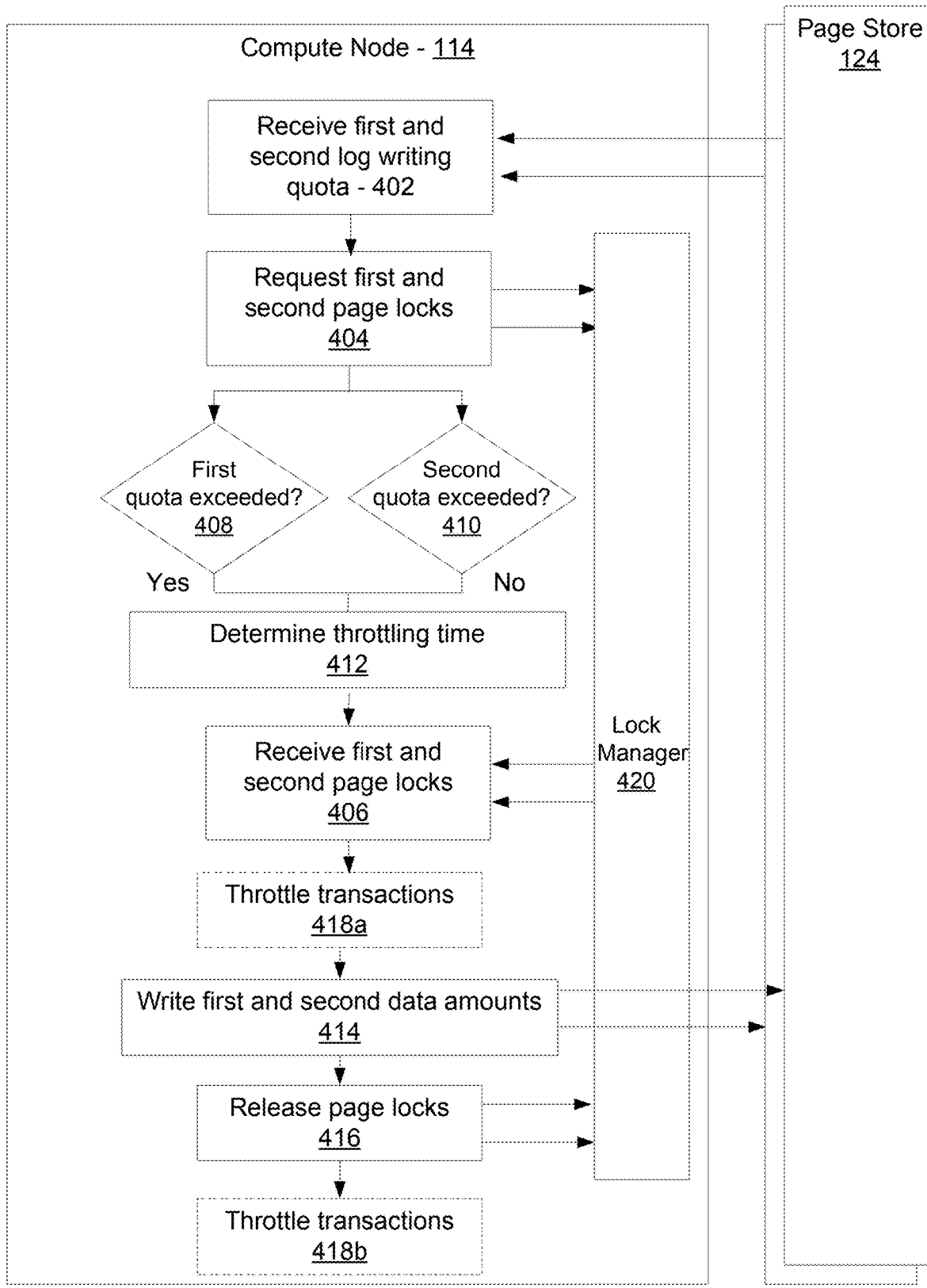
FIG. 4 illustrates a method of managing load in a database system, involving a first page store and a second page store, according to an embodiment.

FIG. 4 illustrates a method of managing load in a database system, which may involve multiple page stores, such as a first page store and a second page store, in an embodiment. As shown in FIG. 4, the method includes multiple steps or actions. At step 402, a compute node (e.g., 114 in FIG. 1 of a computer layer 112) receives from a page store 124 a first log writing quota and a second log writing quota with respect to a first page store and a second page store. Despite in its singularity form, the page store 124 may include a plurality of pages stores. In other words, the first page store may include a first plurality of pages, and the second page store may include a second plurality of pages. At step 404, a first transaction requests a first page lock of a first page to be modified by the first transaction, and a second transaction requests a second page lock of a second page to be modified by the second transaction. Both page lock requests are made to lock manager 420. In embodiments, the first page is part of the first page store, and the second page is part of the second page store. The first query is configured to write a first data amount to a first log, and the second query is configured to write a second data amount to a second log, which in some embodiments the first log and the second log may be the same log. The first query and the second query may be part of a larger transaction. At step 408, the compute node 114 determines whether the first data amount exceeds the first log writing quota. At step 410, the compute node 114 determines whether the second data amount exceeds the second log writing quota. In embodiments, step 408 and step 410 can be performed concurrently. At step 412, the compute node 114 determines the throttling time of one of the first or second queries based on a criteria. Furthermore, at step 406, the first transaction receives the first page lock from a lock manager 420 of the compute node 114 and the second transaction receives the second page lock from the lock manager 420. In embodiments, if at step 406, it is determined that the first quota is exceeded and the second quota is not exceeded, the compute node 114 determines the throttling time of the first transaction based on a criteria of step 412. Otherwise, the compute node 114 determines the throttling time of the second transaction based on the same or a different criteria. In embodiments, if at step 406, it is determined that at least one or both of the first quota and the second quota have been exceeded, and the compute node 114 determines the overall or total throttling time of the first query and the second query of the transaction. Optionally, in step 418a, the first transaction, the second transaction, or both the first transaction and the second transaction may be throttled after receiving the locks in step 406. Optionally, throttling of either or both of the first transaction and the second transaction may occur at anytime once a throttling time is determined. At step 414, the compute node 114 writes the first data amount to the first log, and the second data amount to the second log. At step 416, the transactions release the first page lock and the second page lock. Optionally, at step 418b, the transactions are throttled until an expiry of the throttling time determined at step 412. Thereby allowing the transactions to be completed while still throttling the computer node 114 by the same or a similar amount of time as if the throttling had been performed before the transactions were allowed to complete, while avoiding issues involving "priority inversion"

In embodiments, variations on the method of FIG. 4 are possible. Also, a transaction may check if throttling is presently occurring before a lock is acquired and then throttle or sleep until the throttling period ends, if required. The transaction may then try again to acquire the lock. Alternatively, all already acquired locks can be released for the period of throttling (i.e., sleeping) and reacquired later.

Figure 5:
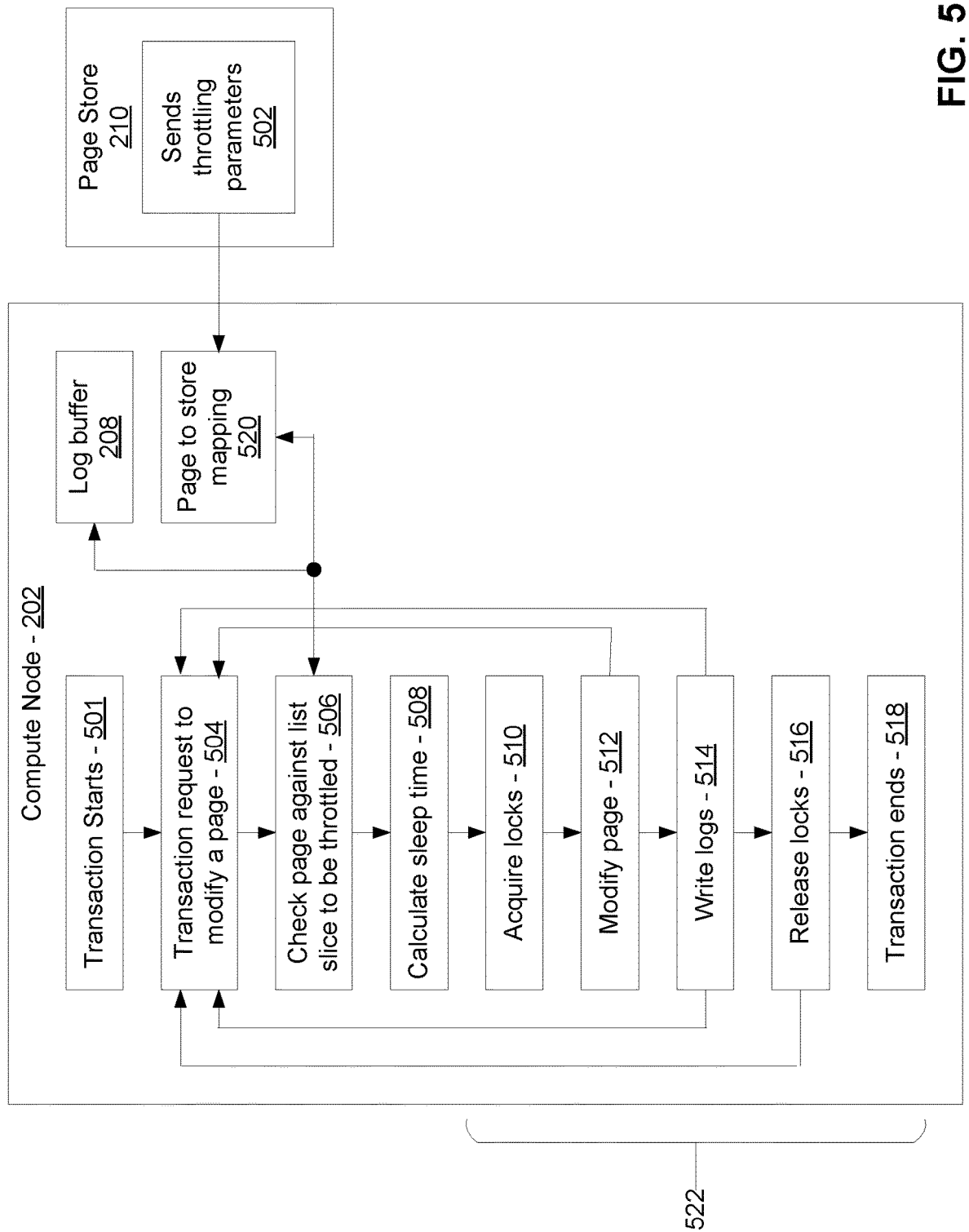
FIG. 5 illustrates a method of managing load in a database system, from the perspective of a transaction, according to an embodiment.

With reference to FIG. 5, a compute node 202 may receive throttling parameters 502 from page store 210. Approaches to throttling include limiting user requests, suspending a problematic transaction during execution and resuming its processing at a later time, pausing transaction execution by self-imposing sleeps at intervals, and allowing compute layer transactions to continue execution while the storage layer is not required. Throttling parameters 502 may include information such as specifying a throttling algorithm, a sleep time, a transaction type to throttle, an indication of whether a transaction may be throttled before or after processing. Throttling parameters 502 may also include parameters related to the throttling algorithm such as a quantity of data (megabytes) that may be sent per second, a number of log records that may be sent per second, a number of bytes or log records over the next number seconds, etc. A page to page store mapping module 520 of compute node 202 receives the throttling parameters 502. Compute node 202 may receive a request (e.g., a transaction or a query) from a user node 104 of a user workload layer 102 and start to process the transaction in step 501. The first step in executing the transaction is to determine if the transaction is to modify a page and to determine the page, in step 504. In step 506, the page is checked against a list of throttled page stores (i.e., a slice, chunk, or other organization of pages) which may be done by matching the page in the page to store mapping module 520. If the page store is being throttled, then the received throttling parameters 502 may be used to calculate a sleep time of the query or transaction in step 508. Any necessary locks may be acquired in step 510 and the process of modifying the page may being in step 512. Logs may be written in step 514 and the data may also be sent to log buffer 208. Once the write process is completed, the locks may be released in step 516, ending the transaction in step 518. In embodiments, throttling of the transaction or queries may be done at any step as indicated by parentheses 522, that is after the sleep time is calculated in step 508. In embodiments, throttling may occur immediately after step 508 or after step 516. Throttling may be done using any suitable method as known in the art including putting a transaction to sleep, slowing down, or delaying the execution of the transaction. Throttling may also be done in a single time period (i.e., in one round) or in multiple time periods. The throttling decision and the amount and type of throttling required may depend on several factors including which page store the page to be modified belongs to, the amount of throttling required as specified in the page store 210 throttling parameters, or the amount of data in the log buffer 208.

A throttled transaction may hold a lock or a latch to a page unrelated to a storage node that is being throttled. In this case, as the query is throttled, it does not allow other transactions that require the same latch to proceed (as the query still holds the lock). This problem may be referred to as a "priority inversion" and is common in systems where a process that holds more than one resource at a time. In embodiments, a transaction may first acquire all necessary locks before executing any part of the transaction. If the transaction is later throttled, it may release all its acquired locks and later reacquires them when the throttling has ended.

Embodiments include a distributed cloud based database, including of a compute layer 112 and a storage layer 122 as illustrated in FIG. 1. Compute layer 112 consists of multiple compute nodes 114 and 116, each serving one or more users 104 and 106. Storage layer 122 consists of multiple page stores 124 126 128, each serving multiple compute hosts 114 116. Each compute host has data stored on one or more storage hosts.

In embodiments, a page store 210, depending on its resource utilization, may publish to a compute layer 112 node an allowed log writing quota. This log writing quota may be specified in a number of ways including by specifying a bandwidth (i.e., MB/s). Nodes of the compute layer 112 may monitor the amount of log data waiting to be written to each page store. A transaction requests a write lock to a page. When lock is granted to the transaction, but before executing the transaction, a check may be performed to determine the amount of existing data pending to be written to the page store that contains this page. If the amount of data to be written is smaller than the quota, the transaction may continue its execution. If the amount is larger, the transaction may release the lock and go to sleep (be throttled) for the time necessary to write the accumulated logs to the page store, at the speed allowed by the quote. Once the accumulated logs have been written to the page store, the compute node may retry acquiring the lock and continue executing the transaction. Transactions that require read access to the same page or access to different pages may proceed. Transaction that require write access to the same throttled page may wait for the next quota period.

Figure 6:
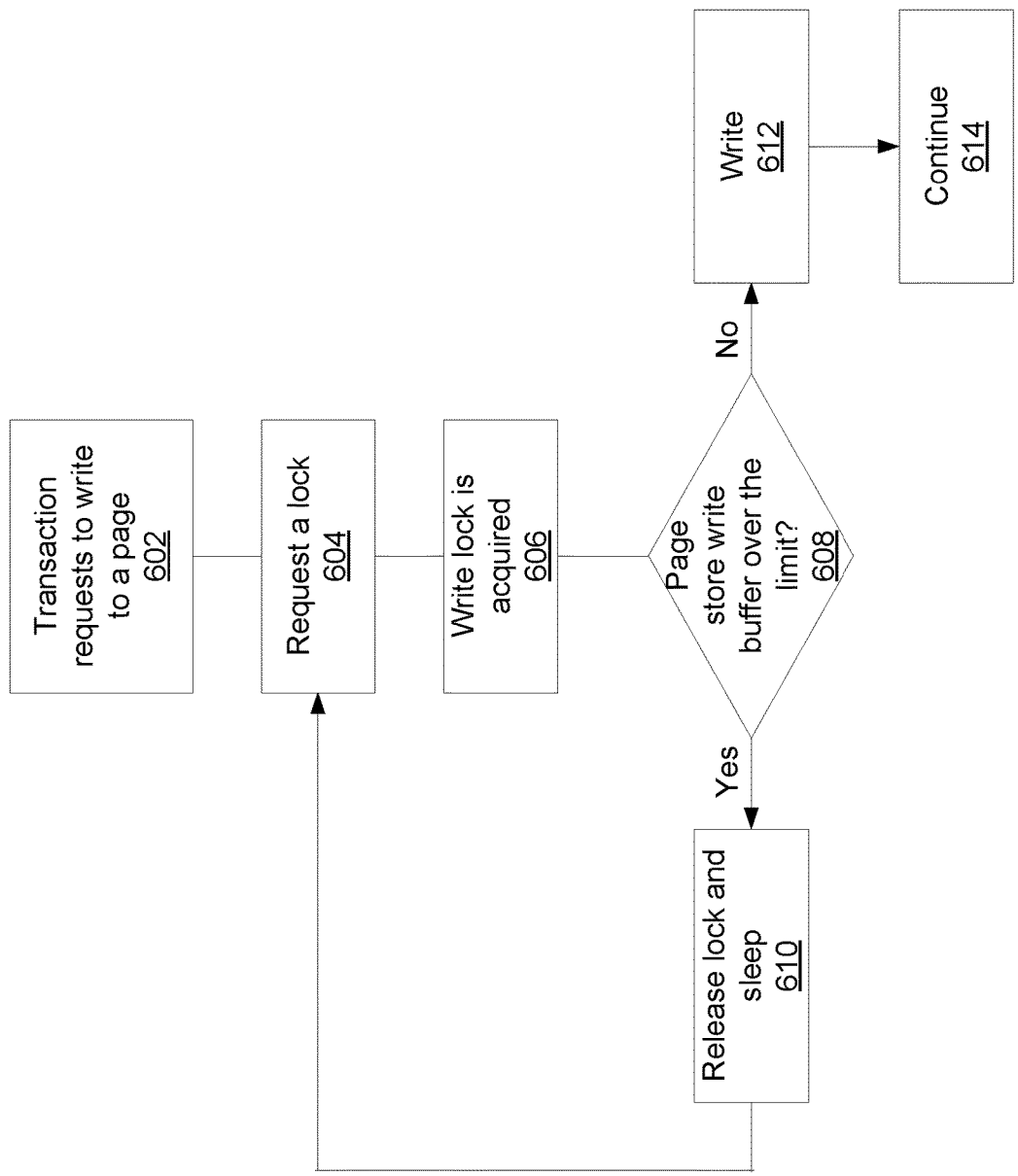
FIG. 6 illustrates an embodiment of an exclusive lock, in accordance with the present disclosure.

With reference to FIG. 6, in step 602, a transaction may request to write to a page of a page store. In step 604, a lock is requested, and the exclusive lock is acquired in step 606. In step 608, it is determined if the amount of data to be written will put the page store write buffer over the limit. If yes, in step 610 the lock is released, and the transaction is throttled (put to sleep). If no, the data is written in step 612 and in step 614, execution may continue. In embodiments, the check if the page store write will be over the limit 608 and the acquiring of the write lock 606 may be released. In embodiments, transaction throttling may also happen between requesting a lock 604 and acquiring the write lock 606, or after data is written 612.

In embodiments, lock starvation may occur due to the random nature of when a transaction may cease being throttled (e.g., awakening from a sleep state.) To avoid this, a Lamport's Bakery algorithm may be used to determine which transaction will get the lock after the sleep in case of multiple transactions try to acquire a lock for a page that is being throttled. Using a Lamport's Bakery algorithm, before a transaction is forced to sleep, it acquires a ticket number, when it wakes up, it checks the currently executing ticket, and if is the same as its own ticket, query continues, otherwise the transaction goes back to sleep. In order to estimate a specific amount of time for throttling a transaction requires, a sliding window algorithm can be used. In embodiments, the period of sleep time can be calculated using any appropriate pre-determined algorithm.

As an example, if a transaction tries to acquire a lock on a first page and there is no throttling applied to the page or its page store, the transaction may proceed once a lock is obtained. If the page store is a throttled to a write speed of 1 MB/s, and there are 10 MB of data in the log buffer with log records for the page store that holds the first page, the query may have wait for 10 seconds before being executed. In the case where there is 5 MB of data, the transaction may have wait for 5 sec. In the case where there is 0.9 MB of data, then since the amount of data is less than the write speed, some of the data may be written in the current window of 1 sec.

In embodiments where the issue of priority inversion is a concern, database transactions may be done using a plurality of mini transactions (MTRs). An MTR may include an atomic set of page reads or writes, and may further include a write-ahead redo log. When executing MTRS, the following method may be used. Before trying to change a page, the MTR may acquire a lock to the page or pages to be modified. Data changes will then be executed, and pages updated. This process of obtaining a lock and updating pages may be repeated for the MTRs, at which point generated log records may be written to a log buffer (i.e., the MTRs will be committed.) Finally, acquired locks may be released. During the process of executing a plurality of MTRs, if a transaction of one of the MTRs is throttled (i.e., put to sleep), the throttled transaction may hold locks of other MTRs, thereby preventing other transactions from executing, even if their execution would not result in writing to the page store or storage node being throttled.

For systems that modify data using MTRs, embodiments may include methods that do not throttle transactions when a lock is to be acquired of a page that belongs to an overloaded storage node. In this case the amount of time required for throttling may be calculated and remembered as per other embodiments. Once the MTRs have been executed, the MTRs may be committed, and the locks may be released. At that time, the transaction may be throttled (e.g., by being put to sleep) for the amount of time calculated previously. The amount of waiting may be the same for embodiments that throttle a transaction before it is permitted to execute so in the effective degree of throttling may be the same, however, no locks are held while the transaction is throttled, and no other transactions are affected.

Figure 7:
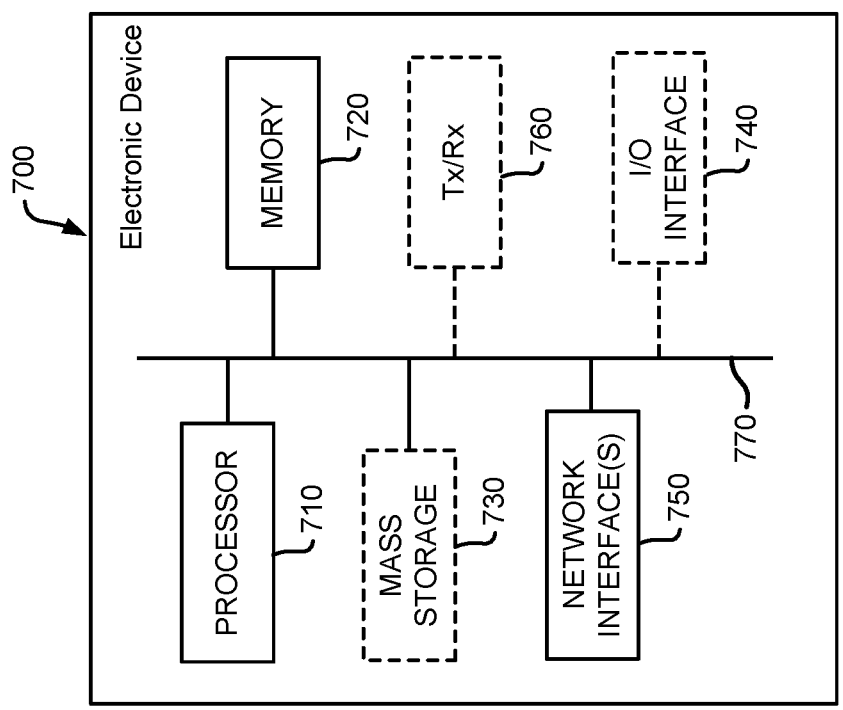
FIG. 7 illustrates an electronic device, according to an embodiment.

FIG. 7 is a schematic diagram of a computing device 700 that may act as a compute node 114, a storage node 124, or a user node 104 of the user workload layer 102 for embodiments of the present disclosure as described herein. It is also noted that computing devices 700 may include microcontrollers, microprocessors, or other processing units which execute program instructions stored in memory, or other digital or analog circuitry, or a combination thereof.

As shown, the device includes a processor 710, such as a Central Processing Unit (CPU) or specialized processors such as a Graphics Processing Unit (GPU) or other such processor unit, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer readable medium products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, cloud device, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of managing load in a distributed database system including a storage layer, the storage layer including a plurality of page stores, each page store of the plurality of page stores including one or more pages for storing data, the method comprising:
   receiving, by a compute node at a compute layer of the distributed database system, from a first page store of the plurality of page stores, a first log writing quota for the first page store;
   receiving, by the compute node, from a second page store of the plurality of page stores, a second log writing quota for the second page store;
   requesting, by a first transaction, a first lock of a first page to be modified by the first transaction, the first page being part of the first page store, the first transaction configured to write a first data amount to a first log;
   requesting, by the second transaction, a second lock of a second page to be modified by the second transaction, the second page being part of the second page store, the second transaction configured to write a second data amount to a second log;
   granting, to the first transaction, by a lock manager of compute node, the first lock;
   granting, to the second transaction, by the lock manager of compute node, the second lock;
   upon determination that the first data amount exceeds the first log writing quota and that the second data amount does not exceed the second log writing quota, determining, by the compute node, a throttling time of the first transaction based on a criteria;
   writing, by the compute node, the first data amount to the first log and the second data amount to the second log;
   releasing, by the first transaction, to the lock manager, the first lock;
   releasing, by the second transaction, to the lock manager, the second lock; and
   throttling, by the compute node, the first transaction and the second transaction until an expiry of the throttling time,
   wherein the throttling includes putting the first transaction and/or the second transaction into a sleep state, and the criteria includes a period of sleep time calculated using an algorithm including a sliding window algorithm.

2. The method of claim 1, wherein the first lock is a write lock.

3. The method of claim 1, wherein the log writing quota is expressed as an amount of data or log records, a rate of data or log records written, or an amount of data or log records written per unit of time.

4. The method of claim 1, further comprising:
   requesting, by a second transaction of the compute node, read access to the page; and receiving, by the second transaction, read access to the page.

5. A compute node at a compute layer of a distributed database system, the distributed database system including a storage layer, the storage layer including a plurality of page stores, each page store of the plurality of page stores including one or more pages for storing data, the compute node comprising:
- at least one processor; and
- a tangible, non-transitory computer readable medium having instructions recorded thereon to be performed by the at least one processor to:
- receive, from a first page store of the plurality of page stores, a first log writing quota for the first page store;
- receive, from a second page store of the plurality of page stores, a second log writing quota for the first page store;
- request, by a first transaction, a first lock of a first page to be modified by the first transaction, the first page being part of the first page store, the first transaction configured to write a first data amount to a first log;
- request, by a second transaction, a second lock of a second page to be modified by the second transaction, the second page being part of the second page store, the second transaction configured to write a second data amount to a second log;
- grant, to the first transaction, by a lock manager of the compute node, the first lock;
- grant, to the second transaction, by the lock manager, the second lock;
- upon determination that the first data amount exceeds the first log writing quota, and that the second data amount does not exceed the second log writing quota, determine, by the compute node, a throttling time of the first transaction based on a criteria;
- write, by the compute node, the first data amount to the first log and the second data amount to the second log;
- release, by the first transaction, to the lock manager, the first lock;
- release, by the second transaction, to the lock manager, the second lock; and
- throttle, by the compute node, the first transaction and the second transaction until an expiry of the throttling time;
- wherein the throttling includes putting the first transaction and/or the second transaction into a sleep state, and the criteria includes a period of sleep time calculated using an algorithm including a sliding window algorithm.

6. The compute node of claim 5 wherein the first lock is a write lock.

7. The compute node of claim 5, wherein the log writing quota is expressed as an amount of data, a rate of data, or an amount of data per unit of time.

8. The compute node of claim 5, wherein the non-transitory computer readable medium has instructions recorded thereon to be further performed by the at least one processor to:
- request, by the second transaction of the compute node, read access to the page; and
- receive, by the second transaction, read access to the page.

* * * * *